United States Patent
O'Sullivan et al.

(10) Patent No.: US 8,091,035 B2
(45) Date of Patent: Jan. 3, 2012

(54) SYSTEM AND METHOD FOR SHARING DATA

(75) Inventors: Patrick Joseph O'Sullivan, Ballsbridge (IE); Sean Callanan, Churchtown (IE); Al Chakra, Apex, NC (US); Gary Denner, Celbridge (IE)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/937,052

(22) Filed: Nov. 8, 2007

(65) Prior Publication Data

US 2009/0125817 A1    May 14, 2009

(51) Int. Cl.
  *G06F 3/00*    (2006.01)
  *G06F 15/16*    (2006.01)
(52) U.S. Cl. ......... 715/753; 715/765; 715/963; 709/204
(58) Field of Classification Search .................. 715/751, 715/753, 963, 764, 765, 781; 709/204
  See application file for complete search history.

(56) References Cited

U.S. PATENT DOCUMENTS

| | | | |
|---|---|---|---|
| 5,093,901 A * | 3/1992 | Cree et al. ..................... | 715/753 |
| 6,523,012 B1 | 2/2003 | Glassman et al. | |
| 6,874,023 B1 * | 3/2005 | Pennell et al. ................ | 709/224 |
| 7,149,288 B2 | 12/2006 | Digate et al. | |
| 2003/0149605 A1 | 8/2003 | Cragun et al. | |
| 2004/0024846 A1 * | 2/2004 | Randall et al. ................ | 709/219 |
| 2004/0034774 A1 | 2/2004 | Le Saint | |
| 2004/0073530 A1 | 4/2004 | Stringer-Calvert et al. | |
| 2004/0073801 A1 | 4/2004 | Kalogridis et al. | |
| 2004/0095378 A1 * | 5/2004 | Vigue et al. ................... | 345/723 |
| 2004/0098275 A1 | 5/2004 | Hubert | |
| 2005/0033813 A1 | 2/2005 | Bhogal et al. | |
| 2005/0256764 A1 * | 11/2005 | Beaumont et al. ............. | 705/14 |
| 2006/0020783 A1 * | 1/2006 | Fisher ........................... | 713/156 |
| 2006/0047557 A1 | 3/2006 | Bieselin et al. | |
| 2006/0080432 A1 * | 4/2006 | Spataro et al. ................ | 709/224 |
| 2006/0085245 A1 | 4/2006 | Takatsuka et al. | |
| 2006/0117264 A1 | 6/2006 | Beaton et al. | |
| 2006/0167731 A1 | 7/2006 | Nishimura et al. | |
| 2006/0200374 A1 * | 9/2006 | Nelken ............................ | 705/9 |
| 2006/0259957 A1 * | 11/2006 | Tam et al. ......................... | 726/3 |
| 2007/0143685 A1 * | 6/2007 | Stillion et al. ................. | 715/733 |
| 2007/0150608 A1 * | 6/2007 | Randall et al. ................ | 709/228 |
| 2008/0140650 A1 * | 6/2008 | Stackpole .......................... | 707/5 |
| 2008/0229244 A1 * | 9/2008 | Markus et al. ................ | 715/811 |
| 2008/0235043 A1 * | 9/2008 | Goulandris et al. .............. | 705/1 |
| 2010/0180212 A1 * | 7/2010 | Gingras et al. ................ | 715/751 |

FOREIGN PATENT DOCUMENTS

| | | |
|---|---|---|
| EP | 1 411 430 | 4/2004 |
| WO | 2007002226 | 1/2007 |

* cited by examiner

*Primary Examiner* — Xiomar L Bautista
(74) *Attorney, Agent, or Firm* — Holland & Knight LLP; Brian J Colandreo, Esq.; V. Raman Bharatula

(57) ABSTRACT

A method and computer program product for establishing a trust relationship between a first user of a collaboration platform and at least a second user of the collaboration platform. Information concerning calendar-related events for the at least a second user is automatically forwarded to the first user.

20 Claims, 6 Drawing Sheets

SYSTEM AND METHOD FOR SHARING DATA

TECHNICAL FIELD

This disclosure relates to sharing data and, more particularly, to sharing data amongst the calendars of multiple users.

BACKGROUND

Situations may arise in medium and large-sized organizations in which individuals miss key meetings or events simply because they were not included on the invitation list. Often, the meeting organizer simply forgets to add the person to the invitation list or the meeting organizer does not have a clear grasp on who should be included on the invitation list.

Conventional calendaring systems may provide rudimentary workarounds, such as an invitee forwarding the email invitation to the third party that was left off of the invitation list, or the third party that was left off of the invitation list asking the meeting scheduler to update the meeting invitation. Unfortunately, when an invitation to an event is forwarded to a third party, if the event is rescheduled, the third party may not be informed of the change. Further, asking a meeting scheduler to add invitees to a meeting requires manual interaction and steps.

In situations where an organization manages multiple meetings, this situation may be frustrating for the scheduler who has to cope with multiple requests for additions to meeting invitation lists. Further, while a third party may review the calendar of another person, this is a manual procedure that requires the third party to proactively police the calendar of another.

SUMMARY OF DISCLOSURE

In a first implementation, a method includes establishing a trust relationship between a first user of a collaboration platform and at least a second user of the collaboration platform. Information concerning at least one calendar-related event for the at least a second user is automatically forwarded to the first user.

One or more of the following features may be included. The information forwarded may include at least one meeting invitation from a third party. The first user may be enabled to review the at least one meeting invitation. The first user may be enabled to accept the at least one meeting invitation.

The information forwarded may include at least one meeting announcement from the at least a second user. The first user may be enabled to review the at least one meeting announcement. The first user may be enabled to accept the at least one meeting announcement.

Establishing a trust relationship may include requesting that the at least a second user grant permission for the information to be automatically forwarded to the first user. Establishing a trust relationship may further include allowing the at least a second user to grant permission for the information to be automatically forwarded to the first user.

The at least a second user may be a mentor and the first user may be a mentee. The at least a second user may be a mentee and the first user may be a mentor. The collaboration platform may include a multi-user calendaring system.

In another implementation, a computer program product resides on a computer readable medium that has a plurality of instructions stored on it. When executed by a processor, the instructions cause the processor to perform operations including establishing a trust relationship between a first user of a collaboration platform and at least a second user of the collaboration platform. Information concerning at least one calendar-related event for the at least a second user is automatically forwarded to the first user.

One or more of the following features may be included. The information forwarded may include at least one meeting invitation from a third party. The first user may be enabled to review the at least one meeting invitation. The first user may be enabled to accept the at least one meeting invitation.

The information forwarded may include at least one meeting announcement from the at least a second user. The first user may be enabled to review the at least one meeting announcement. The first user may be enabled to accept the at least one meeting announcement.

Establishing a trust relationship may include requesting that the at least a second user grant permission for the information to be automatically forwarded to the first user. Establishing a trust relationship may further include allowing the at least a second user to grant permission for the information to be automatically forwarded to the first user.

The at least a second user may be a mentor and the first user may be a mentee. The at least a second user may be a mentee and the first user may be a mentor. The collaboration platform may include a multi-user calendaring system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
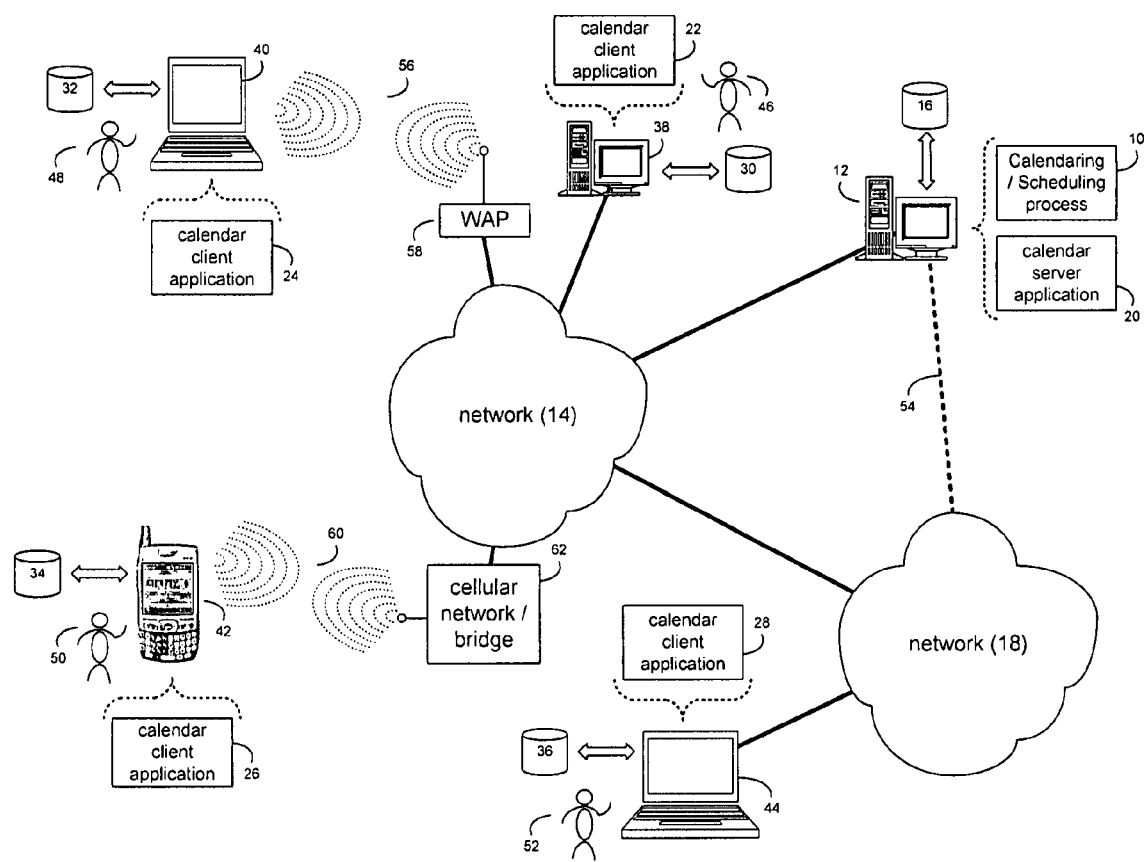
FIG. 1 is a diagrammatic view of a calendaring/scheduling process, a calendar client application and a calendar server application coupled to a distributed computing network.

System Overview:

Referring to FIG. 1, there is shown calendaring/scheduling process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, calendaring/scheduling process 10 may establish a trust relationship between a first user of a collaboration platform and at least a second user of the collaboration platform. Information concerning calendar-related events for the at least a second user may be automatically forwarded to the first user.

Specifically and as will be discussed below in greater detail, one or more users may "tail" the calendar of another user for specific events. Accordingly, the "tailing" user may become aware of events in another person's (i.e., the "tailed" user's) calendar, for the class of events that the "tailed" user approves. For example, John (i.e., the "tailed" user) might be happy to make Fred (i.e., the "tailing" user) aware of all calendar events to which John is scheduled, as John believes that any meeting that he is invited to should also involve Fred (as John and Fred are peers in the same team). Accordingly and in this example, any events that appear in John's calendar may be propagated to Fred's calendar. Further, a preference on John's calendar or Fred's calendar may determine if only meetings that John has accepted propagate to Fred's calendar (i.e., thus filtering any declined/rejected meetings), or if all meetings propagate to Fred's calendar (i.e., regardless of whether or not John accepted the meeting).

The instruction sets and subroutines of calendaring/scheduling process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute calendar server application 20, examples of which may include but are not limited to Lotus Domino™ Server and Microsoft Exchange™ Server. Calendar server application 20 may be a messaging and collaboration software platform that may allow for user collaboration via calendar client applications 22, 24, 26, 28, examples of which may include but are not limited to Lotus Notes™ and Microsoft Outlook™ Calendaring/scheduling process 10 may be a stand alone application that interfaces with calendar server application 20 or an applet/application that is executed within calendar server application 20.

The instruction sets and subroutines of calendar server application 20, which may be stored on storage device 16 coupled to server computer 12 may be executed by one or more processors (not shown) and one or more memory architectures (not shown) incorporated into server computer 12.

The instruction sets and subroutines of calendar client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using calendar client applications 22, 24, 26, 28, users 46, 48, 50, 52 may access calendar server application 20 and may allow users to e.g., schedule in-person meetings, instant-message based meetings; web-based meetings; telephone conferences; and video conferences.

Users 46, 48, 50, 52 may access calendar server application 20 directly through the device on which the calendar client application (e.g., calendar client applications 22, 24, 26, 28) is executed, namely client electronic devices 38, 40, 42, 44, for example. Users 46, 48, 50, 52 may access calendar server application 20 directly through network 14 or through secondary network 18. Further, server computer 12 (i.e., the computer that executes calendar server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Calendaring/Scheduling Process:

For the following discussion, calendar client application 22 is going to be described for illustrative purposes. However, this is not intended to be a limitation of this disclosure, as other calendar client applications (e.g., calendar client applications 24, 26, 28) may be equally utilized.

Figure 2:
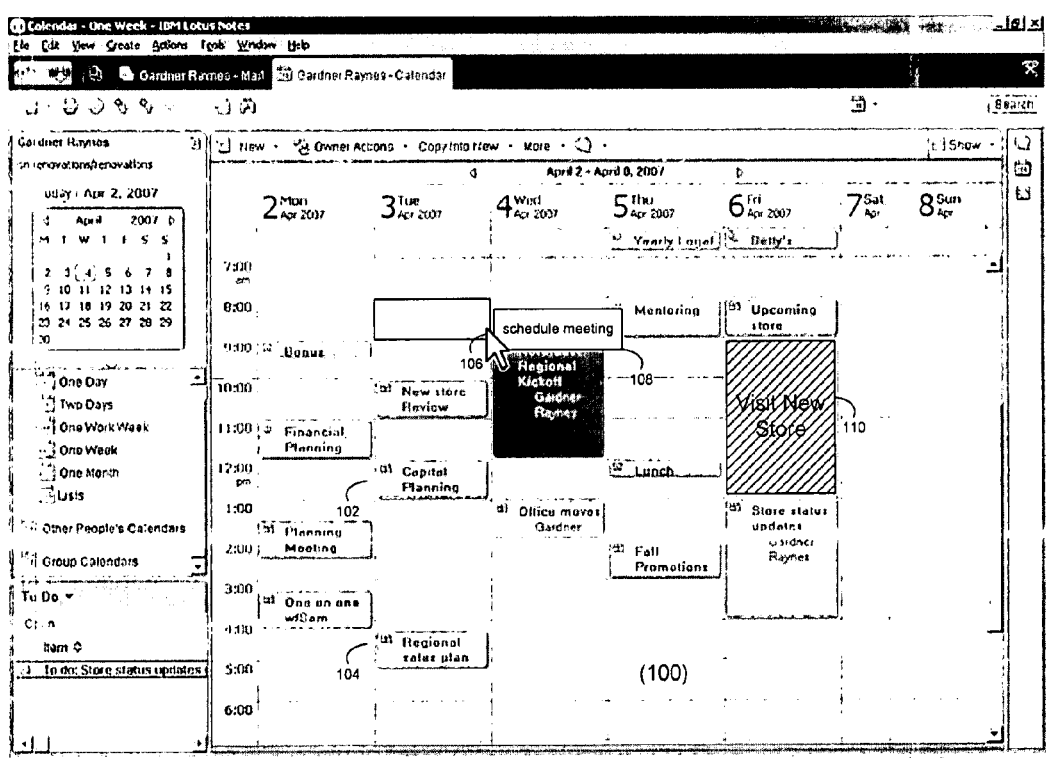
FIG. 2 is a diagrammatic view of a display screen rendered by the calendar client application and/or the calendar server application of FIG. 1.

Referring also to FIG. 2, calendar client application 22 may allow user 46 to schedule meetings through a visual calendaring interface 100. Through visual calendaring interface 100, user 46 may schedule meetings with one or more users (e.g. user 48, user 50, user 52). Accordingly, meeting 102 (which is scheduled from 12:00-1:00 p.m. on Tuesday, 3 Apr. 2007) may be a meeting to which user 46 and user 50 are scheduled to attend. Further, meeting 104 (which is scheduled from 4:15-5:15 p.m. on Tuesday 3 Apr. 2007) may be a meeting to which user 46, user 48 and user 50 are scheduled to attend.

When scheduling meetings, user 46 may select the time period for which the meeting is to be scheduled. For example, user 46 may select, via on-screen pointer 106 (which is controlled by a pointing device such as a mouse; not shown), the desired time period (e.g., 8:00-9:00 a.m. on Tuesday, 3 Apr. 2007). Once selected, user 46 may e.g. right-click the pointing device controlling on-screen pointer 106, resulting in calendar server application 20 and/or calendar client application 22 rendering pop-up window 108. While pop-up window 108 is shown to include only one option, namely "schedule meeting", this is for illustrative purposes only and is not intended to be a limitation of this disclosure, as the number of options included within pop-up window 108 may be increased or decreased depending on the design criteria and user need.

Figure 3:
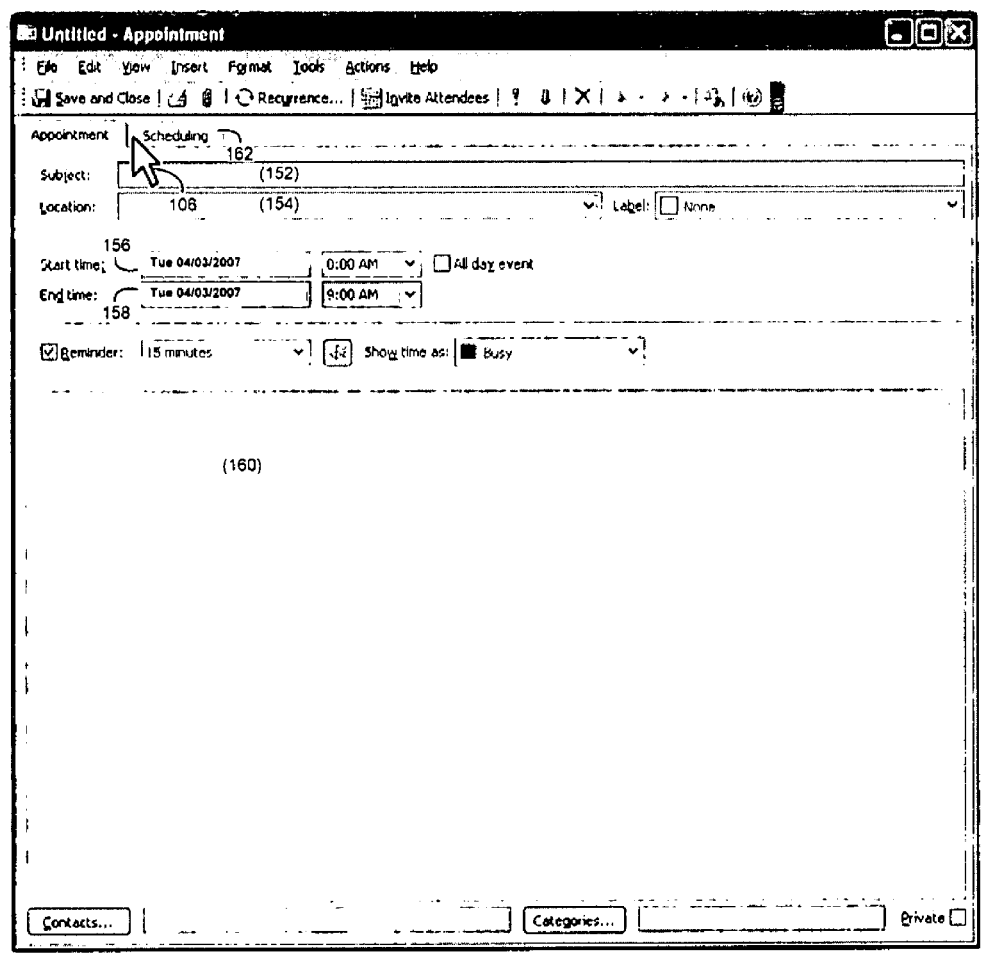
FIG. 3 is a diagrammatic view of a display screen rendered by the calendar client application and/or the calendar server application of FIG. 1.

Referring also to FIG. 3 and upon selecting "schedule meeting" from pop-up window 108, calendar server application 20 and/or client calendar application 22 may render meeting window 150. Meeting window 150 may include a plurality of fields such as: the subject field 152 (which allows user 46 to define the subject of the meeting); location field 154 (which allows user 46 to define the location of the meeting); start time field 156 (which allows user 46 to define the start date/time of the meeting); end time field 158 (which allows user 46 to define the end date/time of the meeting); and comment field 160 (which allows user 46 to define e.g. dial in information; web address information, and video conference information).

Figure 4:
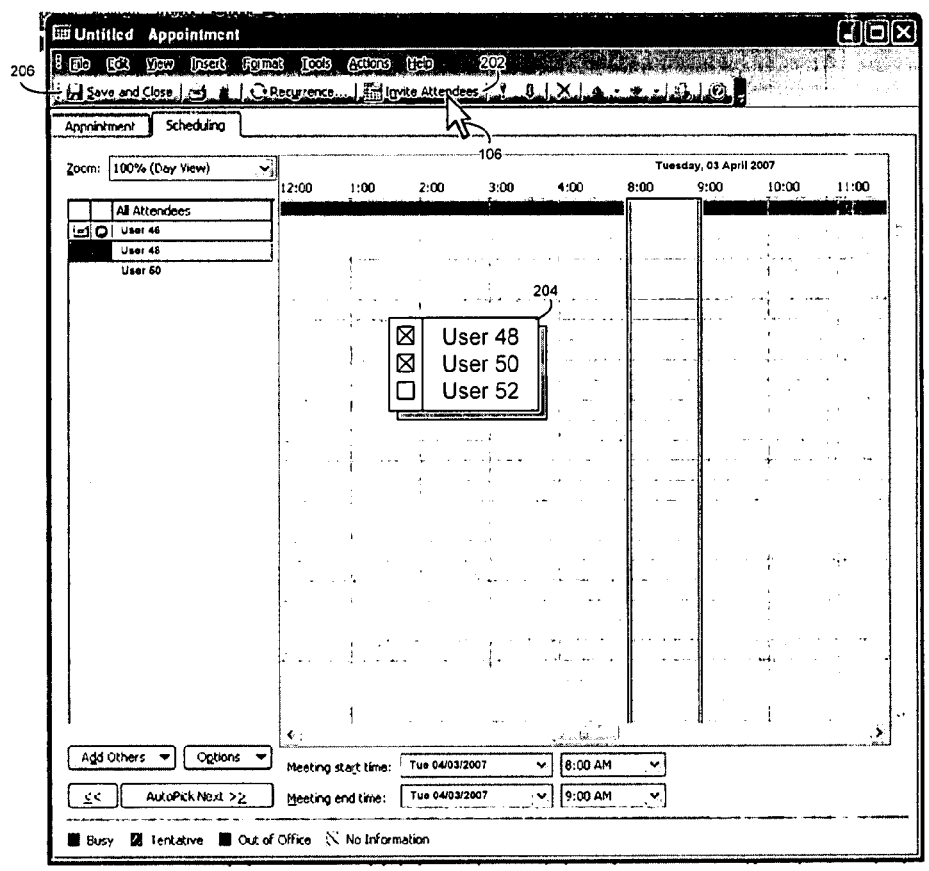
FIG. 4 is a diagrammatic view of a display screen rendered by the calendar client application and/or the calendar server application of FIG. 1.

User 46 may select "scheduling" tab 162 using on-screen pointer 106. Once selected and referring also to FIG. 4, calendar server application 20 and/or client calendar application 22 may render scheduling window 200 which may allow user 46 to invite one or more attendees (e.g. user 48 and user 50) to the meeting being scheduled. Accordingly, by selecting the "invite attendees" button 202 using on-screen pointer 106, attendee window 204 may be rendered by calendar server application 20 and/or client calendar application 22 that allows user 46 to select one or more attendees for inviting to the meeting being scheduled. For illustrative purposes, scheduling window 200 is shown to have user 46, user 48 and user 50 invited to attend the meeting. However, assume that user 52 is not invited, as user 52 is a new employee of Company X and is often overlooked when meetings are scheduled. Upon selecting "Save and Close" button 206, an invitation to the meeting scheduled by user 46 may be sent to e.g., user 48 and user 50.

Figure 5:
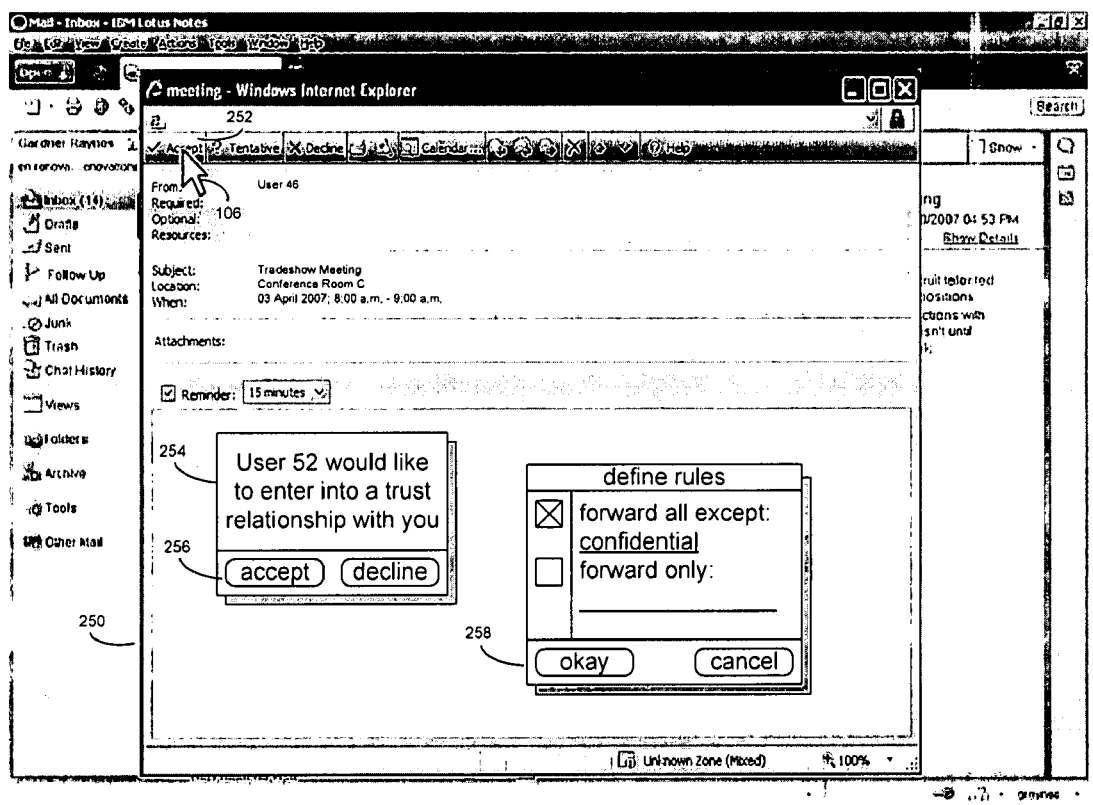
FIG. 5 is a diagrammatic view of a display screen rendered by the calendar client application, the calendar server application and/or the calendaring/scheduling process of FIG. 1.

Referring also to FIG. 5, user 48 and user 50 may receive an email-based invitation to the meeting scheduled by user 46. For example, user 48 may receive invitation 250 in response to user 46 sending out invitations to the meeting that user 46 scheduled. Invitation 250 is shown to include a plurality of fields that define e.g. the sender of the email, whether or not attendance is required at the meeting, the location of the meeting, the date of the meeting, and the time of the meeting. User 48 may review this information and, if they find it acceptable, select "Accept" button 252 using on-screen pointer 106. Upon selecting "Accept" button 252, a response may be automatically generated and provided (via email) to user 46, acknowledging that user 48 plans on attending the meeting scheduled by user 46. Additionally, a notation (not shown) may be placed within visual calendaring interface 100 (of user 46) acknowledging that user 48 plans to attend the meeting.

As discussed above, upon selecting "Save and Close" button 206, an invitation to the meeting scheduled by user 46 may be sent to e.g., user 48 and user 50. However, while user 46 invited users 48, 50 to the above-described meeting, user 46 did not send an invitation to user 52.

Assume for illustrative purposes that user 52 is a new employee of Company X and, unfortunately, many users forget to invite user 52 to various meetings. Further, assume that user 46, user 48, user 50, and user 52 all work within the same engineering group of Company X. Therefore, user 52 should most likely be invited to meetings that user 46, user 48 and user 50 were invited to attend. Additionally, assume that user 48 is the mentor of user 52 (i.e., a new hire of Company X and mentee of user 48).

Figure 6:
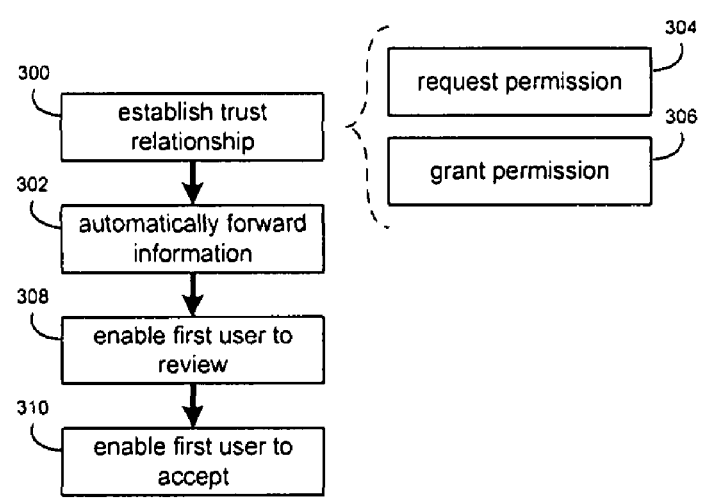
FIG. 6 is a flowchart of the calendaring/scheduling process of FIG. 1.

Referring also to FIG. 6 and as discussed above, calendaring/scheduling process 10 may allow for the establishment 300 of a trust relationship between a first user (user 52) and at least a second user (user 48). Accordingly and unbeknownst to user 46, calendaring/scheduling process 10 may automatically forward 302 information concerning calendar-related events received by e.g., user 48 to e.g., user 52. The above-described trust relationship may be established solely for the purpose of allowing notifications concerning calendar-related events to propagate from one person (e.g., user 48) to another person (e.g., user 52).

Once a trust relationship is established between the two users (e.g. user 48 and user 52), calendaring/scheduling process 10 may allow the users to define one or more rules (to be discussed below in greater detail) that allow for the automated forwarding 302 of calendar-related events from e.g. user 48 to user 52. Since, as discussed above, user 52 is the mentee of user 48, it may be desirable for mentee user 52 to attend the same meetings as mentor user 48. Accordingly, it may be desirable for all (or some) of the meeting invitations received by user 48 to be automatically forwarded to user 52, thus allowing user 52 to review and (if desired) accept and attend one or more of the meetings to which user 48 is invited. Further, it may be desirable for user 52 to be invited to all (or some) of the meetings that are scheduled by user 48.

When establishing 300 a trust relationship between e.g. user 48 and user 52, calendaring/scheduling process 10 may allow user 52 to request 304 that user 48 grant permission for at least a portion of their calendar-related event information to be automatically forwarded 302 to user 52. Further, when establishing 300 the trust relationship, calendaring/scheduling process 10 may allow user 48 to grant permission 306 for at least a portion of their calendar-related event information to be automatically forwarded to user 52.

For example, if user 52 would like to be automatically forwarded information concerning calendar-related events of user 48, user 52 may request 304 that user 48 grant permission for at least a portion of their calendar-related event information to be automatically forwarded to user 52. Accordingly, calendaring/scheduling process 10 may render request window 254 that e.g. informs user 48 that user 52 would like to receive at least a portion of the calendar-related information of user 48. Further, prior to user 48 granting permission 306 to user 52, no such calendar-related event information will be automatically forwarded to user 52. If user 48 finds this trust relationship acceptable, user 48 may enter into the trust relationship by selecting "accept" button 256. In the event that user 48 selects "accept" button 256, calendaring/scheduling process 10 may render rule definition window 258 that allows user 48 to define rules (to be discussed below in greater detail) concerning which calendar-related information may be automatically forwarded to user 52.

Additionally, trust relationships need not be mono-directional. For example, a bidirectional trust relationship may be established between user 48 and user 52 in which e.g., all (or a portion of) the calendar-related event information of user 48 is forwarded to e.g., user 52 and all (or a portion of) the calendar-related event information of user 52 is forwarded to e.g., user 48.

Once the above-described trust relationships are established and the above-described permissions are granted, the forwarding 302 of calendar-related event information from e.g., user 48 to user 52 may be automatic and passive. Further, when a calendar-related event is forwarded 302 from user 48 to user 52, the manner in which the calendar-related event appears within the calendar of user 52 may be visually distinct from calendar-related events entered by user 52 (as opposed to those forwarded 302 by user 48). Examples of such a visual distinction may include but are not limited to a variation in color, a variation in font, and a defined hash pattern. For example, assume that user 48 forwarded to user 46 a calendar-related event for "Visit New Store" on 6 Apr. 2007 between 9:00 a.m. and 1:00 p.m. The corresponding calendar entry (e.g., calendar entry 110) within visual calendaring interface 100 may have a diagonal cross-hatch pattern to differentiate entries that are forwarded 302 from other users (e.g., calendar entry 110) with those entries (e.g., calendar entries 102, 104) that were entered by user 46.

As discussed above, calendaring/scheduling process 10 may allow the users to define one or more rules that allow for the automated forwarding 302 of calendar-related events from e.g. user 48 to user 52. Accordingly, calendaring/scheduling process 10 may allow user 48 and/or user 52 to define rules concerning the manner in which information concerning calendar-related events are forwarded between the users. For example, calendaring/scheduling process 10 may allow user 48 to define a rule that automatically forwards to user 52 information concerning all calendar-related events except meeting invitations from the supervisor of user 52, or meeting invitations from User A (not shown) or User B (not shown) who are personal friends of user 48 and meet monthly during the summer to play golf. Further, if a trust relationship is a bidirectional relationship, calendaring/scheduling process 10 may allow user 52 to define one or more rules that automatically forwards to user 48 information concerning all calendar-related events except those from User C (not shown), User D (not shown) and User E (not shown), who are all members of the mentee group to which user 52 was assigned when he was hired by Company X.

Further, while the above-discussed rules concern sender-side rules that filter the outgoing information stream concerning calendar-related events, other configurations are possible and are considered to be within the scope of this disclosure. For example, calendaring/scheduling process 10 may allow user 48 and/or user 52 to configure receiver-side rules that filter the incoming information stream concerning calendar-related events. For example, suppose user 48 failed to configure the above-described rule in which information concerning calendar-related events from User A (not shown) or User B (not shown) is filtered prior to being sent to user 52, user 52 may configure a receiver-side rule that filters information concerning calendar-related events from User A (not shown) or User B (not shown) upon receipt by user 52.

Additionally, calendaring/scheduling process 10 may allow user 48 and/or user 52 to configure topic-based rules. For example, rules may be established concerning specific meeting types (e.g. repetitious meetings, meetings concerning the same topic, and meetings involving the same set of users), such that meeting invitations adhering to certain topic-defined criteria may be e.g. filtered prior to transmission, filtered upon receipt, automatically accepted, or automatically declined.

Further, as some calendaring programs allow meetings to be defined based upon categories, calendaring/scheduling process 10 may allow e.g. user 48 and/or user 52 to define category-based rules. For example categories may be used by individual users sending calendar-related event information to or receiving calendar-related event information from other users. Accordingly, in the event that user 48 is invited to a meeting in which the category is "confidential", calendaring/scheduling process 10 may allow user 48 to define a rule that prohibits the automatic forwarding of information concerning this calendar-related event to user 52.

As discussed above, user 48 and user 52 may enter into a trust relationship in which at least a portion of the information concerning calendar-related events of user 48 is automatically forwarded to user 52. This trust relationship may allow user 52 (who may be a mentee of user 48) to be automatically given the opportunity to be involved in meetings to which user 48 (who may be the mentor of user 52) was invited.

As discussed above, the information forwarded from user 48 to user 52 may include one or more meeting invitations from a third party, which calendaring/scheduling process 10 may enable 308 user 52 to review. Once reviewed by user 52, calendaring/scheduling process 10 may enable 310 user 52 to except one or more of the meeting invitations. For example and as discussed above, as users 46, 48, 50, 52 are all within the same engineering group of Company X and user 48 is the mentor of user 52, user 48 may enter into a trust relationship with user 52 in which all information concerning calendar-related events of user 48 is automatically forwarded to user 52.

Further, assume that user 46 invites user 48 and user 52 to an engineering meeting to discuss a project that all of users 46, 48, 50, 52 are working on. However, due to the new-hire status of user 52, user 46 forgets to invite user 52 to the engineering meeting. Upon user 48 receiving such an invitation, calendaring/scheduling process 10 (due to the established trust relationship) may automatically forward information relating to this calendar-related event (e.g. an invitation) to user 52. Upon receiving such forwarded invitation concerning the engineering meeting, calendaring/scheduling process 10 may enable 308 user 52 to review such invitation and may enable 310 user 52 to accept such invitation.

While the system is described above in a configuration in which user 48 (i.e. the mentor) automatically forwards at least a portion of the information it receives concerning calendar-related events to user 52 (i.e. the mentee), this is for illustrative purposes only and is not intended to be a limitation of this disclosure as other configurations are possible. For example, a trust relationship may be established in which the mentee automatically forwards to the mentor at least a portion of the calendar-related information of the mentee. In this configuration, the supervising mentor (e.g., user 48) may easily monitor the activities engaged in by the supervised mentee (e.g., user 52).

While the system is described above as automatically forwarding, from user 48 to user 52, information of user 48 concerning calendar-related events, other configurations are possible and are considered to be within the scope of this disclosure. For example, the information automatically forwarded e.g. from user 48 to user 52 may include one or more meeting announcements (as opposed to meeting invitations), wherein a meeting announcement may be indicative of a meeting scheduled by user 48 (as opposed to a meeting to which user 48 was invited). Accordingly, in the event that user 48 schedules an engineering meeting for a project that users 46, 48, 50, 52 are all working on and user 48 inadvertently forgets to invite user 52, upon user 48 sending email-based invitations to users 48, 50, calendaring/scheduling process 10 may automatically forward to user 52 a meeting announcement to this engineering meeting scheduled by user 46. Upon user 48 receiving such a meeting announcement, calendaring/scheduling process 10 may enable 308 user 52 to review the meeting announcement and may enable 310 user 52 to accept the meeting announcement.

While the system is described above as requiring the user who wants to be forwarded information concerning calendar-related events to ask the other user for permission, other configurations are possible and are considered to be within the scope of this disclosure. For example, as user 48 is the mentor of user 52 and user 48 is most-likely knowledgeable that other users will inadvertently forget to invite user 52 to various meetings, calendaring/scheduling process 10 may allow user 48 to contact user 52 and request that user 52 receive information concerning at least a portion of the calendar-related events of user 48. Calendaring/scheduling process 10 may then allow user 48 to review this request and (if acceptable) accept such a request and start receiving information concerning at least a portion of the calendar-related events of user 48.

Rule definition window 258 is intended to be illustrative and not all inclusive. Accordingly, calendaring/scheduling process 10 may allow for the definition of additional rules, all of which are considered to be within the scope of this disclosure. For example, rule definition window 258 may allow a user to specify generally what e.g., gets provided from user 48 to user 52. For example, user 48 may configure calendaring/scheduling process 10 to automatically forward to user 52 all calendar-related events received by user 48. Alternatively, user 48 may configure calendaring/scheduling process 10 to automatically forward to user 52 only calendar-related events that were received and accepted by user 48. Further, calendaring/scheduling process 10 may allow user 48 to formulate binary rules that allow for a high-level of granularity when determining which calendar-related events to forward to e.g., user 52.

Calendaring/scheduling process 10 may work in conjunction with a client-side email process (not shown) and/or server-side email process (not shown) that e.g., automatically forwards 302 to e.g., user 52 one or more received invitations that invite e.g., user 48 to one or more meetings.

A number of implementations have been described. Nevertheless, it will be understood that various modifications may be made. Accordingly, other implementations are within the scope of the following claims.

What is claimed is:

1. A method comprising:
    establishing a trust relationship between a first user of a collaboration platform and at least a second user of the collaboration platform;
    automatically forwarding information concerning at least one calendar-related event for the at least a second user to the first user based upon, at least in part, the established trust relationship between the first user and the second user, wherein the at least one calendar-related event is associated with a calendar application and appears in a calendar of the first user upon forwarding the information, and wherein the information forwarded includes at least one meeting invitation from a third party to the second user; and
    enabling the first user to review the at least one meeting invitation from the third party to the second user.

2. The method of claim 1 further comprising:
    enabling the first user to accept the at least one meeting invitation.

3. The method of claim 1 wherein the information forwarded includes at least one meeting announcement from the at least a second user, the method further comprising at least one of:
    enabling the first user to review the at least one meeting announcement; and
    enabling the first user to accept the at least one meeting announcement.

4. The method of claim 1 wherein establishing a trust relationship includes at least one of:
    requesting that the at least a second user grant permission for the information to be automatically forwarded to the first user; and
    allowing the at least a second user to grant permission for the information to be automatically forwarded to the first user.

5. The method of claim 1 wherein the at least a second user is a mentor and the first user is a mentee.

6. The method of claim 1 wherein the at least a second user is a mentee and the first user is a mentor.

7. The method of claim 1 wherein the collaboration platform includes a multi-user calendaring system.

8. The method of claim 1, wherein the at least one calendar-related event in the calendar of the first user is visually distinct from another calendar-related event in the calendar entered by the first user.

9. A computer program product residing on a computer readable medium having a plurality of instructions stored thereon which, when executed by a processor, cause the processor to perform operations comprising:
    establishing a trust relationship between a first user of a collaboration platform and at least a second user of the collaboration platform;
    automatically forwarding information concerning at least one calendar-related event for the at least a second user to the first user based upon, at least in part, the established trust relationship between the first user and the second user, wherein the at least one calendar-related event is associated with a calendar application and appears in a calendar of the first user upon forwarding the information, and wherein the information forwarded includes at least one meeting invitation from a third party to the second user; and
    enabling the first user to review the at least one meeting invitation from the third party to the second user.

10. The computer program product of claim 9 further comprising instructions for:
    enabling the first user to accept the at least one meeting invitation.

11. The computer program product of claim 9 wherein the information forwarded includes at least one meeting announcement from the at least a second user, the computer program product further comprising instructions for at least one of:
    enabling the first user to review the at least one meeting announcement; and
    enabling the first user to accept the at least one meeting announcement.

12. The computer program product of claim 9 wherein the instructions for establishing a trust relationship include instructions for at least one of:
    requesting that the at least a second user grant permission for the information to be automatically forwarded to the first user; and allowing the at least a second user to grant permission for the information to be automatically forwarded to the first user.

13. The computer program product of claim 9 wherein the at least a second user is a mentor and the first user is a mentee.

14. The computer program product of claim 9 wherein the at least a second user is a mentee and the first user is a mentor.

15. The computer program product of claim 9 wherein the collaboration platform includes a multi-user calendaring system.

16. The computer program product of claim 9, wherein the at least one calendar-related event in the calendar of the first user is visually distinct from another calendar-related event in the calendar entered by the first user.

17. A method comprising:
establishing a trust relationship between a first user of a collaboration platform and at least a second user of the collaboration platform;
automatically forwarding at least one meeting invitation for a calendar-related event associated with a calendar application to the first user, based upon, at least in part, the established trust relationship, wherein the at least one meeting invitation for the calendar-related event was initially from a third party to the second user, and wherein the automatic forwarding is based upon, at least in part, one or more defined rules associated with the established trust relationship; and
displaying the calendar related event in a calendar of the first user upon forwarding the meeting invitation for the calendar-related event associated with a calendar application to the first user.

18. The method of claim 17, wherein the one or more defined rules associated with the established trust relationship include forwarding all calendar-related events received by the second user to the first user except meeting invitations from a supervisor of the second user.

19. The method of claim 17, wherein the one or more defined rules associated with the established trust relationship include forwarding all calendar-related events received by the second user to the first user except meeting invitations marked confidential.

20. The method of claim 17, wherein the one or more defined rules associated with the established trust relationship include one or more topic-based rules for filtering one or more meeting invitations prior to forwarding them from the second user to the first user.

* * * * *